United States Patent [19]

Mort et al.

[11] Patent Number: 4,482,415
[45] Date of Patent: Nov. 13, 1984

[54] SEALING MECHANICAL TUBE JOINTS

[75] Inventors: Charles B. Mort; Dennis W. DeSalve, both of Findlay, Ohio

[73] Assignee: United Aircraft Products, Inc., Dayton, Ohio

[21] Appl. No.: 559,967

[22] Filed: Dec. 9, 1983

Related U.S. Application Data

[62] Division of Ser. No. 207,260, Nov. 17, 1980, Pat. No. 4,453,301.

[51] Int. Cl.³ .................. B32B 31/16; B32B 7/04
[52] U.S. Cl. .................. 156/91; 29/157.3 C; 156/294
[58] Field of Search .................. 29/157.3 A–C, 29/157.3 R, 157.4, 460, 523; 156/91, 92, 294; 285/382, 382.1, 382.2, 382.4, 382.7; 165/79

[56] References Cited

U.S. PATENT DOCUMENTS

| | | | |
|---|---|---|---|
| 3,471,178 | 10/1969 | Roe | 165/79 X |
| 4,152,818 | 5/1979 | Mort et al. | 29/157.3 C |
| 4,295,522 | 10/1981 | Frei | 165/79 |
| 4,421,160 | 12/1983 | Stafford et al. | 156/293 X |

Primary Examiner—Robert Dawson
Attorney, Agent, or Firm—J. E Beringer

[57] ABSTRACT

A method of making leak-tight tube joints, in a non-brazed tubular heat exchanger or the like, including the steps of expanding tube ends out into mechanical contact with a header plate in which they are received, and, in conjunction with this step, introducing a sealant into tube joints. According to one invention aspect, the sealant has the form of a relatively ductile elastomeric or metallic material and is introduced into a joint as a coating on a tube end. In another invention aspect, the sealant has the form of an anaerobic adhesive and is introduced into the joint as a liquid by a capillary action for subsequent curing in the hidden crevices and voids of the joint.

7 Claims, 10 Drawing Figures

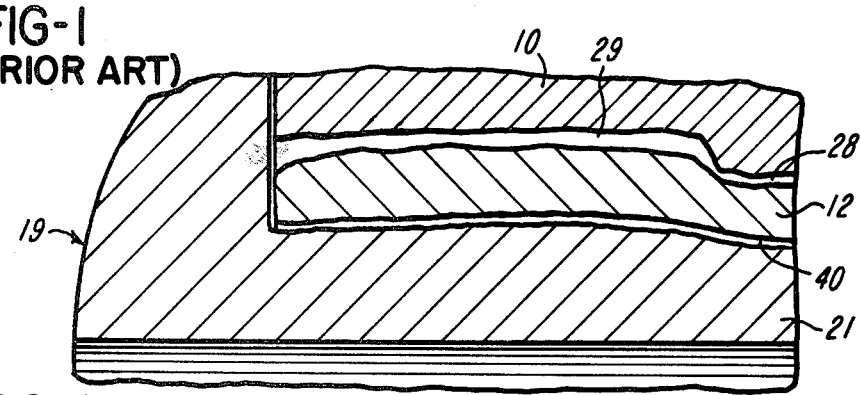
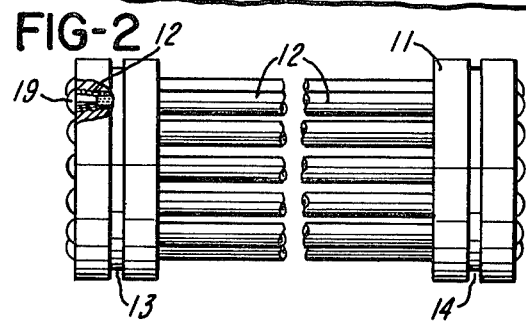
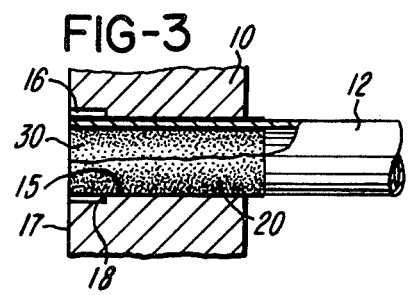
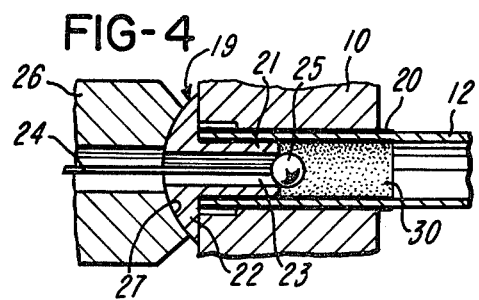
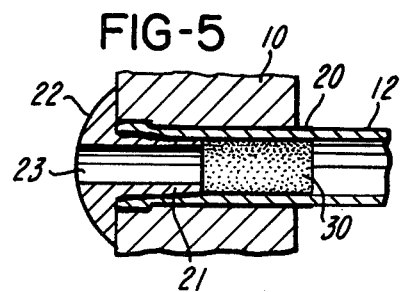
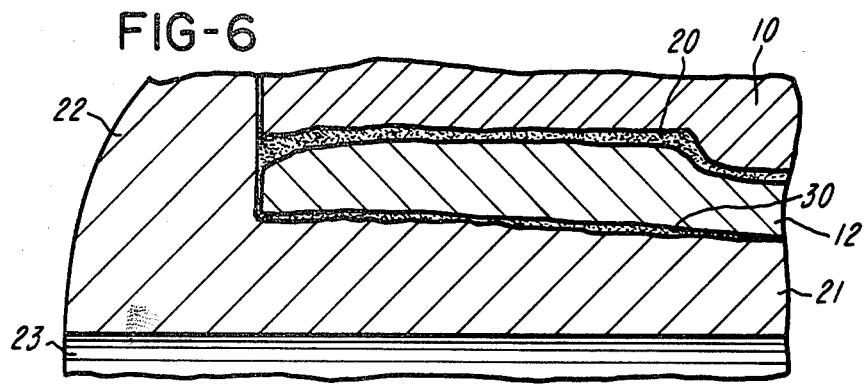

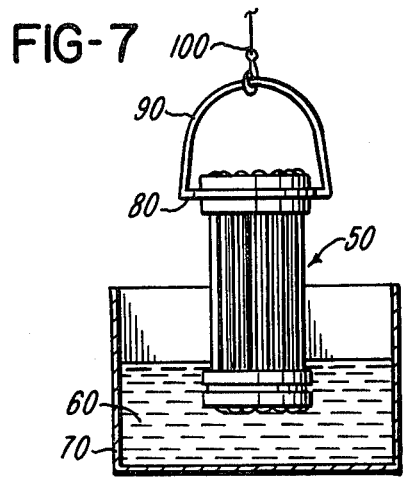
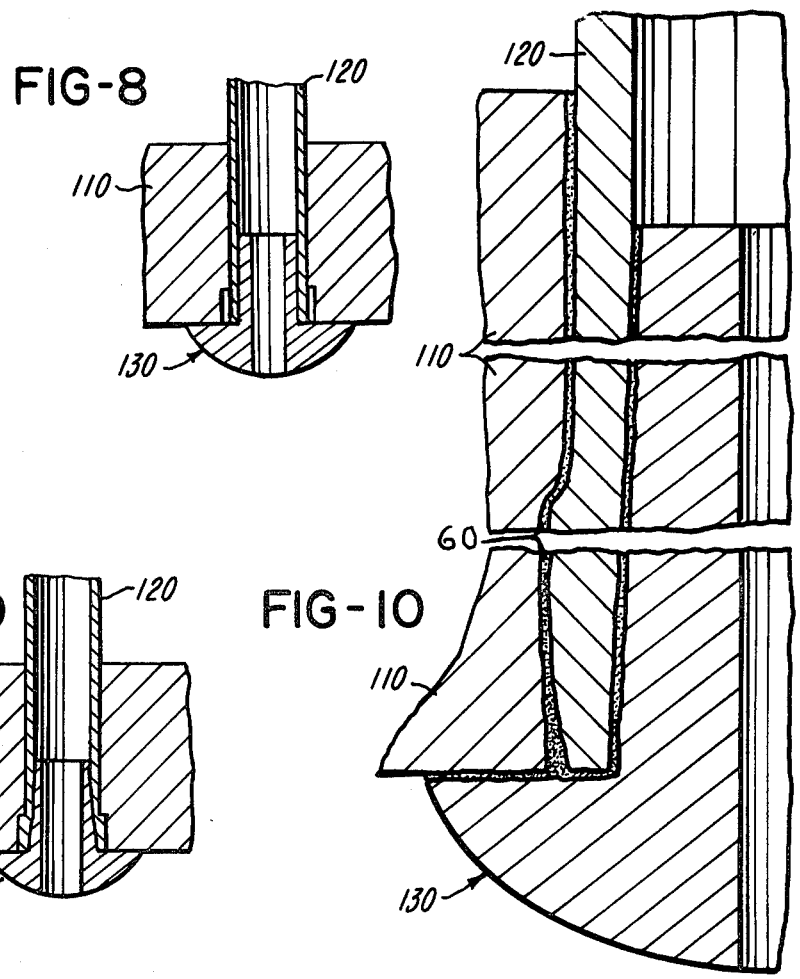

SEALING MECHANICAL TUBE JOINTS

This is a division of application Ser. No. 207,260, filed Nov. 17, 1980 and now Pat. No. 4,453,301.

BACKGROUND OF THE INVENTION

1. Field of the Invention

This invention relates to methods of making leak-tight joints in tube and shell heat exchangers, and particularly to methods applicable to non-brazed heat exchangers.

2. Description of the Prior Art

The invention may be regarded as an improvement upon prior U.S. Pat. No. 4,152,818, issued May 8, 1979 to Charles B. Mort, et al and entitled Making Mechanical Tube Joints. Problems inhering in attempting to make leak-tight joints in non-brazed heat exchangers are explained in that patent, and solutions therefor disclosed. In a preferred solution, according to the patent, a rivet-like member, termed a ferrule is inserted in a tube end and is deformed radially to expand the tube end into contact with the peripheral wall surface of a hole in a header in which the tube end is received. As brought out in the patent, this step is itself insufficient to establish integrity of the tube-header joints, especially under circumstances in which even minor leaks cannot be tolerated. Accordingly, in the patent, the first metal working step is followed by a second metal working step, the two steps being carried out in the course of oppositely directed generally axial thrusts and over specified distances. The second metal working step, while it insures leak-tight joints in the assembled heat exchanger, is an additional process step and adds to production costs. Consideration of ways in which this added step might be omitted, without jeopardizing integrity of the tube-header joints, has led to the present invention.

The foregoing discussion embodies a disclosure of all of the prior art of which we are aware, material to the question of patentability of the invention, and is intended as compliance with revised Section 1.97 of Title 37 of the Code of Federal Regulations.

SUMMARY OF THE INVENTION

According to the present invention, a tube end is expanded, either in the manner taught in the prior patent or in another convenient manner, and in conjunction with this step, imperfections in the created joint are filled and sealed with a relatively flowable sealant material. The described second metal working step of the prior art is omitted.

In one way of putting the invention into practice, tube ends are coated, prior to being assembled into the heat exchanger, with an elastomeric material or with a relatively ductile metal such as silver or copper. Under this condition, when the tube end is expanded into relatively close fitting contact with the header, the material forming the coating is squeezed into and fills all accessible cracks and crevices in the joint. A final sealing of the tube joints thus is accomplished in a single metal working step, using previously prepared parts.

In another way of putting the invention into practice, tube ends are not coated, but rather are assembled into headers in accordance with prior art practice up to but not including the described second metal working step. At this point, ends of the assembly are successively immersed in a provided liquid bath of an anaerobic adhesive. In the course thereof, the liquid adhesive penetrates by capillary action into cracks and crevices of the joint. When the heat exchanger has been removed from the bath, drained and set aside for a suitable period of time, adhesive which has reached hidden voids in the joint cures and forms a seal preventing leaks through the joint.

With respect to either described method, a successful joint assembly is less dependent upon part tolerances and does not require metal working operations other than that which may be necessary initially to expand tube ends into contact with header wall surfaces.

An object of the invention is to provide a method of sealing mechanical tube joints substantially in accordance with the foregoing discussion.

Other objects and details of the invention method will appear more clearly from the following description, when read in connection with the accompanying drawings, wherein:

FIG. 1 is a greatly enlarged view of a fragment of a tube-header joint, as it exists in the prior art following the first of the utilized first and second metal working steps;

FIG. 2 is a view in side elevation of a tubular heat exchanger core, comprised of header plates and tubes mounted therein, a portion of one of the plates being broken away to show a tube joint;

FIG. 3 is a detail view, enlarged with respect to FIG. 2, showing a fragment of a header plate and an end of a tube installed therein prior to being expanded to form the tube joint, the tube end having been pre-coated with a material adapted to act as a sealant;

FIG. 4 is a view similar to FIG. 2, showing a ferrule installed in the tube end and a mandrel inserted in the ferrule preparatory to effecting expansion of the tube end;

FIG. 5 is a view like FIGS. 2 and 3, showing the tube joint as it appears after the metal working operation of FIG. 4;

FIG. 6 is a fragmentary view, like FIG. 1, showing in expanded, and somewhat exaggerated form how separations in the tube-header joint are filled with the tube coating;

FIG. 7 shows a process step in accordance with another aspect of the invention in which an assembled heat exchanger core is dipped in a liquid anaerobic adhesive to seal joint voids;

FIG. 8 is a fragmentary view, similar to FIG. 3 but showing parts in an assembly process in accordance with the method of FIG. 7;

FIG. 9 is a view like FIG. 8, showing parts expanded but as they appear prior to the dipping step of FIG. 7; and FIG. 10 is an enlarged fragmentary view showing how in the process step of FIG. 7, an adhesive material has been caused to penetrate the joint of FIG. 9.

Referring to the drawings, the invention has particular although not limited utility in the making of a tubular heat exchanger core as illustrated in FIG. 2. The core comprises spaced apart header plates 10 and 11 interconnected by tubes 12. The core assembly comprising plates 10 and 11 and tubes 12 will in a conventional use of such an assembly position within a surrounding shell and have one or both ends joined to a manifold structure. The header plates have respective exterior grooves 13 and 14 in which a sealing ring or the like is mounted. A first fluid is confined by the surrounding shell and flows over and between the tubes 12. A second fluid has access through the manifold structure to an end face of one of the plates 10 or 11 and flows longitudinally through the tubes 12 to discharge at opposite ends thereof. The arrangement is one to effect a transfer of heat between the first and second fluids through the walls of tubes 12. Sealing devices installed in the grooves 13 and 14 prevent intercommunication if the first and second fluids around the header plates. Mechanical, leak free joints where the tubes are received within the header plates prevent an intercommunication of the first and second fluids around the tube ends.

The header plates 10 and 11 are substantially identical so that a description of one will suffice for both. Similarly, the manner of effecting a tight, sealed joint between each tube end and a respective plate is the same for all of the tubes 12 so that a description of one will suffice for all. Thus, the plate 10 has a through bore 15 receiving a respective tube 12. At one end of the bore 15 is a counterbore 16 opening through an outer end face 17 of the header plate. The tube 12 is made of a metallic material having sufficient rigidity to cooperate with other tubes and with the header plates 10 and 11 in defining a relatively stationary arrangement of parts comprising the core assembly. The tube is relatively thin for good heat transfer properties and is deformable in the sense that portions thereof within the header plate may be expanded into close fitting contact with walls defining bore 15 and counterbore 16. The tube 12 is inserted into the bore 15 in an appropriate manner, as by a hand or machine operation, and is allowed to assume a position therein substantially as indicated in FIG. 3 where one end of the tube positions substantially in the plane of face 17. The tube extremity accordingly projects through counterbore 16 and is in a radially spaced relation to the cylindrical wall surface defining the counterbore. The bottom of the counterbore defines a shoulder 18 and the manner of forming the counterbore is such as to cause the shoulder 18 to be a sharp edged surface perpendicular to the outer surface of the tube 12. In this connection, the bore 15 may be formed in any convenient manner, as by drilling. Counterbore 16 may be formed separately from or in conjunction with the forming of bore 15, as by means of a shouldered drill tool forming the counterbore as a part of the same operation by which bore 15 is formed.

In the illustrated instance of FIG. 3, that end of tube 12 received in header 10, as well as the opposite end received in header 11, has an exterior coating 20 and an interior coating 30, the purposes of which will hereinafter more clearly appear.

In a step following insertion of the tube 12 in the header plate, a tubular rivet or ferrule 19 is inserted in that end of the tube opening through plate surface 17. The ferrule 19 includes a cylindrical body or shank portion 21 adapted to be received within the tube and a head portion 22 adapted to limit against face 17. Body portion 21 of the ferrule has an outside diameter which approximately equals the inside diameter of tube 12. The ferrule has a central bore 23 opening through body 21 at what may be regarded as an inner end thereof and opens through head 22. The ferrule 19 is made of a relatively rigid yet deformable material, in accordance with its function in assisting in deforming the tube 12. The ferrule is inserted in the tube end as a part of an assembly further including a wire-like mandrel 24 to one end of which is fixed a generally spherical member 25 having a diameter somewhat greater than the diameter of bore 23. The mandrel 24 is received at an opposite end in a pneumatic gun, a nose portion 26 of which is shown in FIG. 4 hereof. Nose portion 26 has an end cavity 27 adapted to receive ferrule head 22. Within the gun 26, mandrel 24 has a detachable connection with a pulling mechanism which when energized exerts an axial pulling motion upon the mandrel. Prior to the mandrel being engaged with pulling mechanism within the gun 26, a ferrule 19 is slipped over the mandrel and allowed to assume a position of rest in engagement with the enlarged spherical member 25 defining the mandrel extremity. The mandrel is then engaged with pulling mechanism in the gun and nose portion 26 is brought to a position to seat against ferrule head 22. The parts at this time assume a relationship to one another substantially as illustrated in FIG. 4. As will be seen therein, the shank or cylindrical portion 21 of the ferrule 19 appreciably exceeds in length the depth of counterbore 16. If pneumatic gun 26 now is energized to exert a pull on mandrel 24, the enlarged, spherical end member 25 on the mandrel will be drawn through bore 23, the reaction of this applied force being sustained by the interengagement of gun nose portion 26 and ferrule head 22. In the process of moving through bore 23, the spherical member 25 displaces material defining the wall of the bore in a generally radial sense. Deforming pressures thus applied are transmitted through the shank body 21 of the ferrule to the tube 12 where they result in the tube being crowded into a relatively close fitting contact with the wall of plate bore 15. As the member 25 passes through a plane coincident with shoulder 18, tube material is deformed into the counterbore 16, and, as the member 25 is drawn completely through and out of the bore 23, the tube expands substantially to fill the counterbore 16. The parts are at this time substantially in a position as illustrated in FIG. 5 wherein the ferrule 19 is effectively installed in a tube 12, and, in expanding, has deformed the tube into a relatively tight fit in the bore 15 and in counterbore 16.

In the prior art, which does not contemplate a use of the coatings 20 and 30, the foregoing constitutes a first metal working step. If the parts, as formed by such metal working step, are subjected to inspection by a microphotographic process, or the like, it will be found that the deforming of the tube 12 outwardly into contact with the bore 15 and outwardly into contact with the wall defining counterbore 16 has not effected a sealing interengagement of the parts. The relationship of the parts may, for example, be that illustrated in FIG. 1 which is a magnification of a portion of the joint as formed without use of the coatings 20 and 30. As there indicated, whereas it would appear to normal inspection that the tube 12 is in a uniformly contacting relation to the wall of bore 15 and fills counterbore 16, there actually is a lack of uniformity in contact in these areas resulting in gaps 28–29 between the tube and header plate and a gap 40 between the tube and body portion 21 of the ferrule 19. The occurring gaps provide leak paths around the tube 12 and resulting leaks may be of minor or major proportions according to the kind and pressure of the fluids brought to the heat exchanger, as well as in accordance with variations in the tolerances to which the parts have been made.

The coatings 20 and 30 are comprised of a material which can be displaced or caused to flow under the degree of pressure applied by an expanding ferrule body 21. A rubber or rubber-like compound may be used or a Teflon material or the like. A relatively ductile metal, such as silver or copper may also be used to form the coatings. Known methods of application of the coatings are available, such as dipping, spraying and, in the case of metallic coatings, electrodepositing. A coating thickness will be selected related to known or expected clearances between the parts. A coating thickness on the order of 0.002 of an inch will serve in at least some instances. Also, in most instances it will be desirable to coat both inner and outer surfaces of a tube end, as is here illustrated. The invention may, however, be regarded as being complete in the presence of a tube only one surface of which is coated.

The header aperture 15 will be dimensioned relatively closely to accept a tube 12, with its applied coating. Similarly, body portion 21 of the ferrule 19 will be dimensioned relatively closely to be received within the inside diameter of the tube as it includes coating 30. The coatings 20 and 30 are, it will be understood, applied to the tube ends prior to their assembly to the headers so that, after assembly to a position as shown in FIG. 3, nothing remains but to complete the installation process shown in FIGS. 4–5.

In the course of this process, the material of the relatively soft coatings 20 and 30 is squeezed and caused to flow in a manner substantially to fill areas of separation 28–29 and 40. Irregularities of surface configuration are readily accommodated and the coating material is forced into all accessible cracks and crevices. The result, as seen in FIGS. 5 and 6, is to fill gaps inside and outside the tube ends with the coating material, positively preventing an escape of pressure fluid therethrough. In an exaggerated illustration, the head 22 of ferrule 19 may be seen as slightly spaced from header face 17 due to surface irregularities. This is not a location of significant leakage but will inherently be at least partly sealed by squeezed coating material. The process of expanding ferrule 19 accordingly not only fixes the tube end within its accommodating header but also forms a positive seal against an escape of fluid through the defined joint. Secondary swaging or like metal working operations are unnecessary.

In another way of putting the invention into practice, sealant material is not introduced into header joints as a coating on the tubes but is instead introduced subsequent to core assembly as a liquid which upon curing becomes a sealant. Thus, in accordance with this form of the invention method, tube ends are not coated but are assembled to a header substantially in the manner shown in FIGS. 3–5. This has the result of fixing the tubes to the headers but tube-to-header and tube-to-ferrule joints are not yet filled with a sealant as in FIG. 6 but rather are effectively open, as illustrated in FIG. 1. A completely assembled, but unsealed, core 50 (FIG. 7) then is suspended in a vertical orientation over a bath of a liquid anaerobic adhesive 60 held in a tank 70. A bracket 80, including a bail member 90, can be temporarily attached to one end of the core and suspended from an overhead cable means 100. The opposite end of the core positions over the tank 70, and, upon lowering of the cable means 100, may be immersed in the liquid bath 60. The core is allowed to descend until the header plate at the immersed end is fully submerged, as for example to a position substantially as shown in FIG. 7. The core is removed after an appropriate interval, which may be on the order of one to two minutes, and then inverted and the process repeated with respect to the opposite end. The core is then drained and set aside for curing of the retained anaerobic material. As will be understood, the liquid adhesive has access to joint gaps 28–29 and 40 and moves into and fills those gaps by a process of capillary action. Being substantially denied exposure to the atmosphere, after penetrating joint voids and crevices, the adhesive material cures to a more solid form and acts as a sealant, substantially in the manner that squeezed coatings 20 and 30 act in the first considered embodiment. In the fragmentary view FIG. 8, a header 110, a tube 120 and a ferrule 130 have the same relationship of parts shown in FIG. 3. In this assembled condition of the parts, ferrule 130 is expanded and the parts assume a position as shown in FIG. 9. This position corresponds to FIG. 5, but, since the tube is uncoated, gaps inherently exist in the joint, as indicated in FIG. 1. A completed core, with all tubes fixed as shown in FIG. 9, then is dipped in the manner suggested in FIG. 7, with results being as substantially diagrammatically shown in FIG. 10.

All of the joints across the face of a heat exchanger at one end thereof are in contact simultaneously with the liquid body of adhesive. All joints are, therefore, simultaneously sealed. Anaerobic adhesives suitable for use in the present invention are commercially known and available. One such material, suitable for present purposes, is identified as Loctite 601, made by Loctite Corporation.

As before indicated, the invention has particular, although not limited reference to tube and shell heat exchangers, particularly heat exchangers of a high performance type using lightweight materials and providing a high density of heat transfer surface. The integrity of the joints where the tubes contact the header plates is almost completely dependent on the sealing efficiency of the contacting surfaces to preclude intermixing of the tube side fluid with the shell side fluid. In the design and formation of these joints, compatability of detail part tolerances, part geometry, part differential hardness, and mandrel sizes assume great importance. Establishing and controlling these features without additional effort at achieving leak protection can be difficult and costly. The instant invention provides sealing of contacting surfaces in a manner obviating much of the need for design perfection either through use of pre-coated tubes or in a process step involving the use of liquid adhesives.

It will be evident that the invention method lends itself to specifically disclosed and other modifications within broad outlines of invention teachings. These and other modifications as may occur to persons skilled in the art having this invention disclosure before them are regarded as being within the scope of the claimed invention.

We claim:

1. A method of sealing mechanical tube joints in a tube and shell type heat exchanger, including the steps of;
    a. providing a pair of header plates each with multiple relatively closely spaced apart tube accommodating through holes;
    b. providing tubes made of a deformable metallic material;
    c. coating portions of the ends of the tubes with a relatively ductile flowable material softer than the material of the tubes;
    d. installing end coated tubes between said header plates, coated tube end portions being received in respective tube accommodating through holes in said header plates; and e. deforming tube ends out into close fitting contact with header plate wall surfaces defining said through holes to an extent to fix the tubes relative to the header plates and to squeeze the relatively soft coating material between the tube ends and surrounding header wall surfaces causing it to flow and to fill communicating voids.

2. A method according to claim 1, wherein the tube ends are coated over portions of their length at least equal to the thickness of the header plates in which the tubes are installed.

3. A method according to claim 1, wherein the thickness of the applied coating is on the order of 0.002 of an inch.

4. A method according to claim 1, wherein the coating is applied to both the interior and exterior of the tube ends, the deforming of the tube ends being accomplished by the radial expansion of a ferrule inserted in each coated tube and interior.

5. A method of sealing mechanical tube joints in a tube and shell type heat exchanger, including the steps of:

a. providing a pair of header plates each with multiple relatively closely spaced apart tube accommodating through holes;

b. installing tubes between said header plates, tube ends being received in respective tube accommodating through holes in said header plates;

c. expanding tube ends to achieve a relatively close fitting contact of exteriors thereof with surrounding header wall surfaces defining said through holes forming thereby a tube and header plate assembly;

d. immersing at least one end portion of said assembly into a liquid body of an anerobic adhesive and holding it so immersed while the liquid material travels by capillary action into voids between tube and exteriors and said surrounding header wall surfaces; and e. removing the tube and header plate assembly from the body of the anerobic adhesive and allowing retained liquid material to cure.

6. A method according to claim 5, wherein the tube and header plate assembly is suspended in endwise orientation over said liquid body of anerobic adhesive is lowered to immerse an end of said assembly into said liquid body a distance at least to submerge the header plate at said one end, is held immersed for an interval of time sufficient for liquid material to penetrate to and to fill said voids, and is then removed and inverted and the suspension and immersion and removal process steps repeated with respect to the other end of the assembly, said assembly after both ends have been immersed being set aside for curing.

7. A method according to claim 6, the period of time of immersion for each end of the assembly being on the order of one minute.

* * * * *